(12) United States Patent
George et al.

(10) Patent No.: US 10,983,625 B2
(45) Date of Patent: Apr. 20, 2021

(54) SYSTEMS AND METHODS FOR MEASUREMENT OF UNSUPPORTED USER INTERFACE ACTIONS

(75) Inventors: William Brandon George, Pleasant Grove, UT (US); Kevin G. Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 13/335,648

(22) Filed: Dec. 22, 2011

(65) Prior Publication Data
US 2014/0189716 A1  Jul. 3, 2014

(51) Int. Cl.
G06F 3/041 (2006.01)
G06F 3/038 (2013.01)
G06F 9/451 (2018.01)

(52) U.S. Cl.
CPC ........... *G06F 3/0416* (2013.01); *G06F 3/038* (2013.01); *G06F 9/451* (2018.02)

(58) Field of Classification Search
CPC ......... G06F 3/048; G06F 9/4443; G06F 3/038
See application file for complete search history.

(56) References Cited

U.S. PATENT DOCUMENTS

| 6,397,256 | B1 | 5/2002 | Chan et al. | |
| 6,741,967 | B1* | 5/2004 | Wu | G06Q 30/02 705/1.1 |
| 6,951,022 | B1* | 9/2005 | Golde et al. | 719/318 |
| 7,594,166 | B1* | 9/2009 | Ramakrishna et al. | 715/234 |
| 7,644,375 | B1 | 1/2010 | Anderson et al. | |
| 7,886,202 | B2 | 2/2011 | Lin et al. | |
| 7,911,626 | B2 | 3/2011 | Ferlitsch | |
| 7,941,525 | B1* | 5/2011 | Yavilevich | 709/224 |
| 8,006,187 | B1 | 8/2011 | Bailey | |
| 2004/0107387 | A1* | 6/2004 | Larsson et al. | 714/39 |
| 2005/0193391 | A1* | 9/2005 | Demsey et al. | 719/313 |
| 2005/0278630 | A1 | 12/2005 | Bracey | |

(Continued)

OTHER PUBLICATIONS

ClickTale, Oct. 2011, <http://web.archive.org/web/20111001004707/http://www.clicktale.com/>, 2 pages.*

(Continued)

*Primary Examiner* — Doon Y Chow
*Assistant Examiner* — Carina Yun
(74) *Attorney, Agent, or Firm* — Kilpatrick Townsend & Stockton LLP

(57) ABSTRACT

An unsupported event module may install one or more event handlers in an application, wherein the one or more event handlers are configured to catch user interface events not otherwise handled by the application. During execution of the application, one or more unsupported event handlers may record user interface events not otherwise handled by the application. The method further includes storing or transmitting one or more records of the user interface events recorded by the one or more unsupported event handlers. Other embodiments may include receiving, from a plurality of remote computing devices, records of user interface events. The recorded user interface events from a plurality of computers implementing instances of an application may be aggregated to generate a report indicting the number of user interface events not otherwise handled for the application.

33 Claims, 7 Drawing Sheets

(56) References Cited

U.S. PATENT DOCUMENTS

| | | |
|---|---|---|
| 2008/0004937 A1 | 1/2008 | Chow et al. |
| 2008/0222618 A1 | 9/2008 | Valtchev |
| 2011/0264787 A1* | 10/2011 | Mickens et al. ............ 709/224 |
| 2011/0302513 A1 | 12/2011 | Ademar et al. |

OTHER PUBLICATIONS

Brereton, Richard, "Object Oriented Programming on Personal Computers," Analyst, Oct. 1994, vol. 119, p. 2149-2160. (Year: 1994).*

U.S. Appl. No. 13/625,792, filed Sep. 24, 2012, William Brandon George Et al.

U.S. Appl. No. 13/408,961, filed Feb. 29, 2012, William Brandon George Et al.

* cited by examiner

Application Level Report

|  | Event Attempts | Visitors | Attempt Percentage |
|---|---|---|---|
| Swipes | 56 | 276 | 20% |
| Undos | 14 | 276 | 5% |
| Ctrl+T | 1 | 276 | <1% |

*FIG. 6A*

View Level Report

|  | Event Attempts | Visitors | Attempt Percentage |
|---|---|---|---|
| View A |  |  |  |
| Swipes | 25 | 80 | 31% |
| Rotations | 16 | 80 | 20% |
| Pinches | 4 | 80 | 5% |
| View B |  |  |  |
| Swipes | 1 | 45 | 2% |
| Rotations | 19 | 45 | 42% |
| Pinches | 21 | 45 | 47% |

*FIG. 6B*

Object Level

|  | Event Attempts | Visitors | Attempt Percentage |
|---|---|---|---|
| Corporate Logo (View A) - Clicks | 945 | 6,755 | 14% |
| Legend Text (View B) - Clicks | 393 | 6,755 | 6% |
| Table Column Header (View B) – Double-Taps | 79 | 6,755 | 1% |

*FIG. 6C*

SYSTEMS AND METHODS FOR MEASUREMENT OF UNSUPPORTED USER INTERFACE ACTIONS

BACKGROUND

Computing devices have become widely available in recent years. Examples of computing devices are laptops, tablets, smart phones and gaming consoles. Typically a wide variety of software and/or applications are implemented on the computing devices. The software and/or applications may be word processing, mail tools, image processing, games and/or web-based browsers. The computing devices may implement a user interface to facilitate the user to interact with the software implemented on the computing device. The user interface may accept mouse operations, touch screen operations, accelerometer changes and/or keystrokes to initiate an event in the software on a computing device. For example, a smart phone may accept touch screen operations to activate an application, select an object on the screen and/or enter data (e.g. type an email). As another example, a word processing application implemented on a tablet may commonly use key strokes such as Control-S to save the word processing file. As another example, a mouse click may be used on a laptop to select a link in a web-based browser application.

Users may expect actions at the user interface such as those described above to always yield events supported in the software implemented for a certain computing device. There are many common events that users may expect to be supported in various applications, operating systems and/or platforms. For example, a desktop computer user may expect a mouse click selecting text in a web-based browser to be a link to more information in a web-based browser. As another example, a user may wish to view a webpage on a smart phone in a landscape view so the user physically rotates the device from portrait to landscape expecting the screen to rotate to a landscape view. As another example, a user of an image processing and/or word processing document may execute Control-Z expecting to undo the last action. As a further example, a tablet user may touch an image within a webpage they are viewing expecting the image to zoom to a larger size.

When the user attempts any of the above actions and does not receive the expected result, the user may become frustrated. This may degrade the overall user experience.

SUMMARY

Various embodiments of methods and systems for measuring unsupported user interface events are presented. In some embodiments, a method for measuring unsupported user interface events includes installing one or more event handlers in one or more levels of an application, where the one or more event handlers are configured to catch user interface events not otherwise handled by the application. A user interface event may comprise a touch screen event, mouse click event, keyboard event, device movement event and/or voice command event. The method may include recording user interface events not otherwise handled by the application during execution of the application. In addition, the method may further include storing or transmitting one or more records of the user interface events recorded by the one or more event handlers.

The method described above may be performed by a module or plug-in added to the application, device or platform for which it is desired to monitor and record unsupported user interface events. The method may be implemented by program instructions stored on a non-transitory computer readable storage medium or memory where the program instructions are executable by a computing device or processor to carry out the described method.

In some embodiments, a method and system for aggregating and reporting unsupported user interface events may be implemented. The method may include receiving user interface event records from a plurality of remote computing devices each implementing an independent instance of the application. The user interface event records may comprise information corresponding to unsupported user interface events (e.g., touch screen, mouse click, keyboard event, etc.). The method may further include receiving information regarding visitor and/or user identifiers for each remote computing device. The method may further include generating a report based on the aggregated user interface event records.

BRIEF DESCRIPTION OF THE DRAWINGS

FIGS. 6A-C is a table that depicts an exemplary set of reports in accordance with an embodiment of the present technique.

Figure 1:
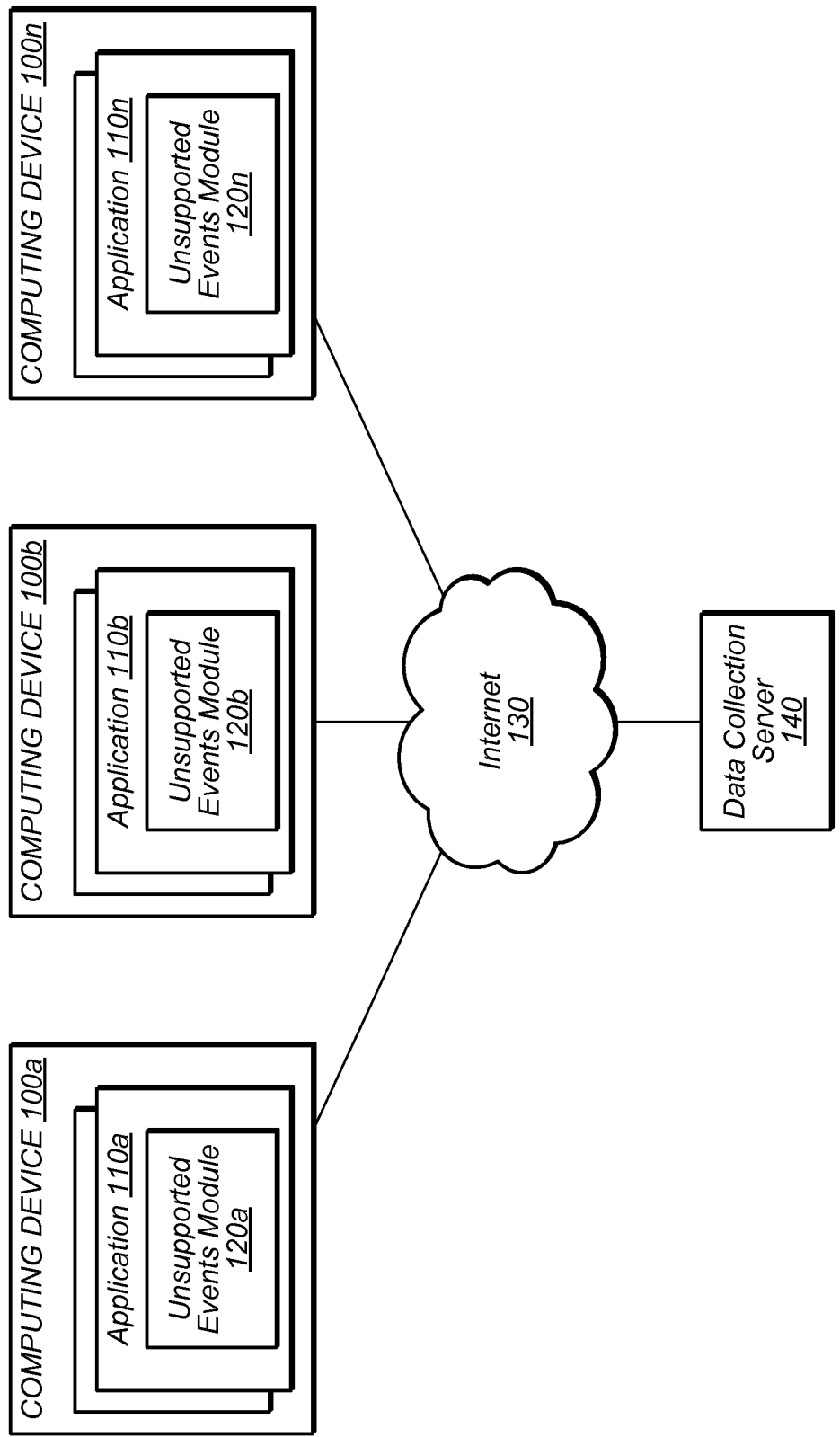
FIG. 1 is a diagram that illustrates an exemplary configuration that supports measuring unsupported user interface events in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

In any software application, device, or platform (e.g., desktop, web, mobile, games, TV) there are many ways for the user to interact with the interface, depending upon the application context and input devices. Users will often try to perform actions throughout the application that are not handled by the software (e.g., the user makes a swipe gesture on a mobile application's touch screen, but nothing happens). Either because the action is commonplace to the context or for a different reason, the user expects the software to do something after she has performed a given action. This could pertain to navigation, basic interaction, or any user interface element. Users become frustrated when the action yields no results, which degrades the overall user experience. In addition, users may simply be frustrated or confused about a given interface, and they are trying to alleviate their problem by performing one of these unused actions. For instance, the fact that many users are attempting to rotate a mobile device application may actually indicate that the image displayed on the interface is too small, not simply that rotation functionality should be added.

As discussed in more detail below, provided in some embodiments are systems and methods for measuring unsupported user interface events. The system and method may include a module or plug-in that installs one or more unsupported user interface event handlers in an application, for example. The event handlers may be configured to catch user interface events not otherwise handled by the application. In some embodiments a user interface event not otherwise handled by the application may be recorded by one of the event handlers. The unsupported user interface event handlers may be installed at points in the event handling structure of the application such that the unsupported user interface event handlers receive user interface events only if the user interface events are not elsewhere handled in the application. In other embodiments, the unsupported user interface event handlers may receive user interface events and determine whether the events were handled elsewhere in the application. During execution of the application, one or more of the event handlers may record user interface events not otherwise handled by the application. In addition, the recorded user interface events may be stored or transmitted. The recorded information corresponding to the user interface events not handled may include an event type and/or the event context. The event type may indicate the type of event, such as mouse click, touch gesture, keyboard key combination, etc. The event context may be reported as coordinates within the screen, in terms of views, and/or in terms of the user interface element for the event, for example.

In addition, the recorded information may be transmitted to a data collection server that aggregates recorded information received from multiple independent instances of the application. The recorded information corresponding to the user interface events not handled, may be used to update a usage metric associated with the user interface event not handled. The recorded information for each independent instance of the application may include visitor identifiers and/or user identifiers in addition to the event type and/or event context discussed above. A report may be generated for the aggregated recorded information.

For example, in some embodiments, a user of an image processing application on a laptop may expect a keystroke combination of Control-S to save the changes to the image. The user may execute the Control-S, expecting the save to occur, but later learn when closing the image that the Control-S did not save the image. The user may learn this through a pop-up window on the laptop display asking, "Do you want to save changes?" Unknown to the user, though, an unsupported user interface event module installed for the image processing application recorded the unsupported user interface event (e.g., Control-S) and transmitted it to a log and/or data collection center. Based on the amount of unsupported user events reports received from one or more independent instances of the application, the developer of the image processing application may implement a "save" short-cut (e.g., Control-S) in future releases of the image processing application.

In another example embodiment, a smart phone user may view a webpage on a web-based browser. The user may then select text representing a link via a screen touch and open a new web page. On the new web page, the user may select a text, logo, or image that the use expects to include a link, but a new webpage does not load. The unsupported user interface event module installed for the browser application may record the event type (e.g., screen touch) and the event context (e.g., text selected, image, coordinates on the webpage, etc.) for the unsupported user interface event. This information may be transmitted to a log and/or data collection center. Based on the amount of unsupported user interface events reports corresponding to the selected text received from one or more independent instances of the webpage, the webpage developer may choose to update the webpage to change to add the expected link.

FIG. 1 is a diagram that illustrates an exemplary configuration that supports measuring unsupported user interface events in accordance with one or more embodiments of the present technique. In general, a computing device 100 may be any type of computing device, such as a laptop and/or personal computer, a smart phone, a tablet, television, set-top box, and/or a gaming console. Each computing device 100 may implement one or more applications 110 that are operable to receive user actions from the user interface coupled to the computing device. Example of an application 110 are one or more web pages viewable from a web-based browser, a word processing application, and/or an image processing application. A user event at the user interface may be a user clicking a mouse, a user touching a screen, a movement of the device, and/or a user pressing a key on a keyboard. In order for application 110 to respond to user events at the user interface, the application may implement an event handler configured to respond to user events. One or more event handlers may be implemented at multiple levels of an event handling mechanism of application 110. In addition, unsupported events module 120 may be installed, plugged-in, or otherwise implemented within application 110 to capture events that do not have a corresponding event handler. The unsupported user interface events may be reported from each independent instance of application 110 on computing device 100 to data collection server 140. Data collection server 140 may be configured to receive recorded information reflecting unsupported user interface events in each independent instance of application 110 on each computing device 100. Data collection server 140 may aggregate the recorded information to report metrics corresponding to user interface event not otherwise handled by the application. This will be described in further detail below.

Computing device 100 may be a tablet computer, mobile phone, smart phone, personal computer, gaming console and/or other processor based device configured to receive user interface events. Each computing device 100 may have a user interface configured to receive the user action. Example of a user interface, not explicitly shown, are keyboards, mouse, interactive screens and/or accelerometers configured to determine changes in movement of computing device 100. Each computing device may have an operating system (OS) configured implement one or more applications 110. The OS (e.g., Window, Mac, Apple iOS, Android, etc.) native to each computing device may be configured to receive one or more user interface events at one or more user interfaces and pass the user event to one or more corresponding applications 110.

Application 110 may be software configured to execute within the OS environment of computing device 100. Examples of application 110 are web-based browser configured to display web pages, an image processing application, a word processing application, a calendar tool, a mail tool and/or entertainment "app" (e.g., "apps" for smart phones). Application 100 may also include content that responds to user interface events (e.g., interactive content), such as web pages, games, videos, etc. Each application 110 on computing device 100 may implement one or more event handlers, not explicitly shown, configured to receive user interface events from the OS and/or user interface of computing device 100. The one or more event handlers may receive a user interface event such as a single mouse click, a double mouse click, a mouse over, a mouse drag, a screen touch, a screen pinch, a scroll, a key press, key combinations, swipes, zooms, rotations, general movement or freeform gestures (e.g., Kinect™ movement events), and/or voice activation, for example. Each user interface event may cause the event handler to activate a corresponding response within application 110. However, there may be user interface events that do not have a corresponding event handler within application 110 and/or are not otherwise supported by the application 110.

Unsupported event module 120 may be implemented internal and/or external to application 110 to capture user events that do not have a corresponding event handler within application 110. For example, unsupported event module 120 may be implemented at the end of the application event handling hierarchy to capture unsupported user interface events that propagate through the application's event handling hierarchy without being handled by the application. Unsupported event module 120 may be configured as a plug-in and/or embedded within application 110 code.

In addition, unsupported event module 120 may record and/or transmit information corresponding to user interface events not otherwise handled by an existing event handler of the application (e.g. unsupported user interface events) to data collection server 140. As depicted in FIG. 1, there may be one or more computing devices 100 with one or more applications 110 including one or more unsupported events modules 120. Accordingly, information corresponding to user interface events not otherwise handled by the application may be recorded and/or transmitted to data collection server 140 for multiple instances of the application. The information corresponding to unsupported user interface events may also include additional analytics data, such as identifiers for each computing device and/or user. Data collection server 140 may aggregate the data for each application and calculate a metric representing the number of users who attempted a given unsupported user interface event, for example. In some embodiments, data collection server 140 may aggregate data for the event handlers in each instance of application 110 to report usage trends. The reports generated from data collection server 140 may provide an application developer with data used to determine development of new features for a new release of the application.

For example, the view for an application in a smart phone may adjust from a landscape to a portrait view when the smart phone is rotated. A developer of an entertainment "app" may decide that this feature is not necessary for their "app" and do not implement the feature. However, the developer may implement an unsupported events module to track the number of rotate attempts for each individual instance of the app on remote computing devices. Each instance of the unsupported events module in each instance of the application may record and/or transmit information gathered from the unsupported events module. The information may be received by data collection server and/or sent in a log directly to the developer. The number of rotate attempts per unique user may determine if the next release of the "app" has the rotate feature implemented.

Figure 2:
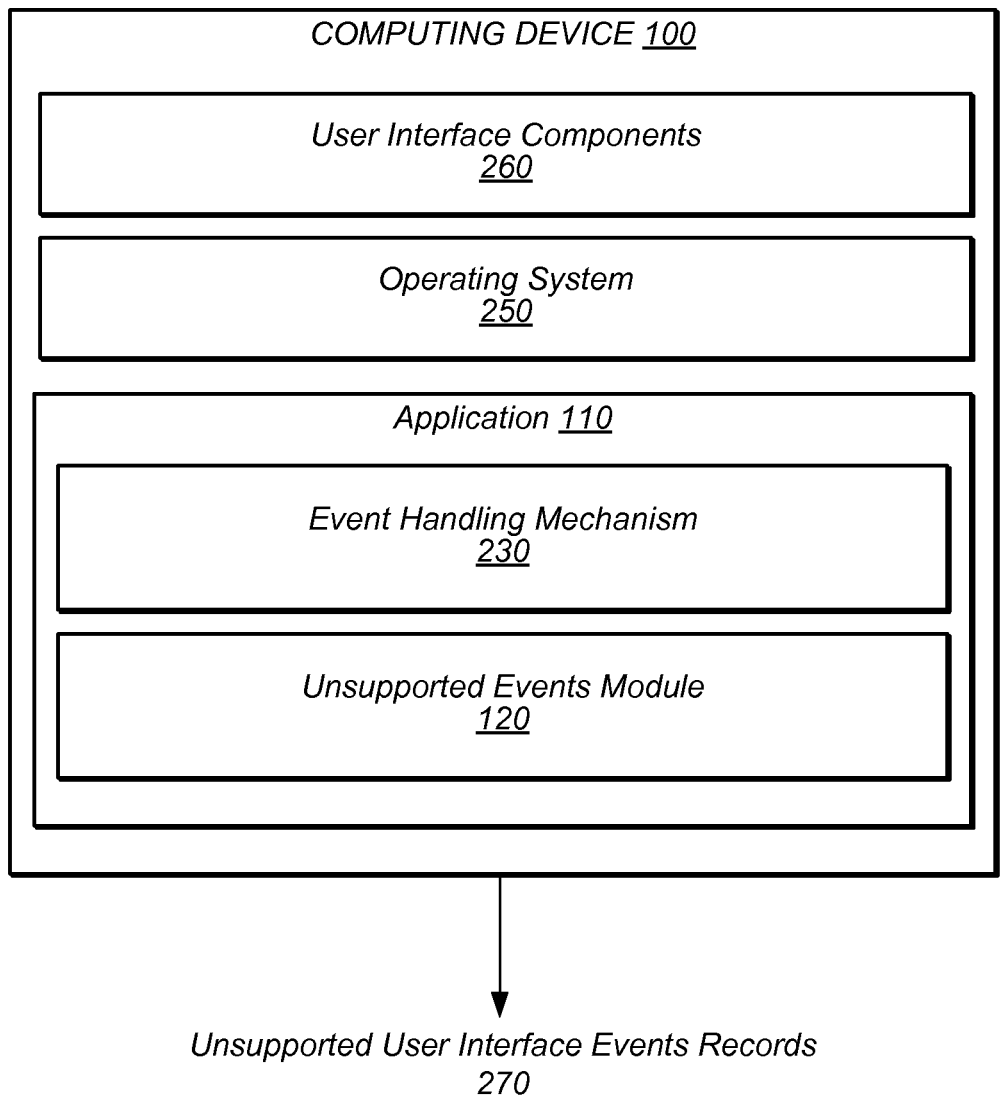
FIG. 2 is a diagram that illustrates an exemplary hierarchy for measuring unsupported user interface events in accordance with one or more embodiments of the present technique.

FIG. 2 is a diagram that illustrates an exemplary hierarchy for measuring unsupported events in accordance with one or more embodiments of the present technique. In general a computing device (e.g., computing device 100 in FIG. 1) has an operating system 250 configured to accept and/or disposition user interface events from user interface components 260 to application 110. As discussed above in FIG. 1, user interface events may be received from a mouse, keyboard, touch screen, movement and/or voice activation. The OS 250 (e.g., Windows, MAC, Android, Apple iOS, etc.) may support one or more applications 110. The application 110 has an event handling mechanisms 230 configured to handle (e.g., cause the application to respond to) user interface events generated from one or more user interface components 260 (e.g., received via OS 250). To capture information about user interface events not supported by the application's event handling mechanism 230, unsupported events module 120 may be added or otherwise provided at one or more points within the application 110 or event handling mechanism 203. For example, unsupported events module 120 may be implemented at the highest (or lowest, depending on the direction of event propagation) level of an event handler hierarchy of event handling mechanism 230 to capture events not otherwise handled by event handling mechanism 230. The information received in the unsupported events module 120 may be recorded and/or transmitted in unsupported user interface events records 270.

Computing device 100, as described above in FIG. 1, may be a tablet, smart phone, laptop and/or desktop computer, for example. Each computing device 100 may have user interface components 260, operating system 250 and/or one or more applications 110 implemented. As discussed above operating system 250 may be Windows, MAC, Apple IOS and/or Android, for example. Each operating system may be configured to receive user events from the user interface components 260. Example of a user interface components 260 are keyboards, mouse, interactive screens, and/or accelerometers or other motion sensors configured to determine changes in movement of computing device 100 or users. Examples of user events are mouse clicks, screen touches, movements, and/or key presses.

Application 110 may be any software configured to executing within the OS of computing device 100. Application 110 may include, but is not limited to, a word processing tool, an image processing tool, a mail tool and/or an "app" on a smart phone and/or tablet. Application 110 may be configured to receive user interface events from the operating system. As discussed above, the OS receives the user interface events from user interface components 260. Application 110 may also comprise event handling mechanism 230 to handle the received user interface events. As an example, if the application is a web page, the event handling hierarchy of the application may be based on an HyperText Markup Language (HTML) structure of the page. One or more objects, paragraphs, images, and/or portions of text may be selectable to provide more information. For example, double clicking on an image may cause a view to zoom in on the image. As another example, clicking on a word may select a link associated with the word and provide more information and/or navigate to a new web page. An event handler associated (e.g. event handling mechanism 230) with the object, paragraph and/or image responds to the user interface event (e.g. clicking a mouse).

Event handling mechanism 230 may implement event handlers at multiple levels within the hierarchy of application 110. In some embodiments, the event handling mechanism may be implemented as "bubble up" or "trickle down". In a "bubble up" implementation, the lowest level potential element for the event is selected, and if an event handler is not present for that element, the application may look to the next higher level in the hierarchy for an event handler until it reaches the top of the hierarchy. In a "trickle down" implementation, a user interface is tested at the highest level in the event handling hierarchy of the application, and if an appropriate event handler is not implemented, the application may look to the next lower level in the hierarchy for an event handler until it reaches the bottom of the hierarchy. Unsupported user interface events traverse the application's event handling hierarchy from end-to-end without being handled.

Unsupported events module 120 may be implemented to capture cases where an event handler is not implemented for a given element of a user interface. Unsupported events module 120 may be implemented at the highest (e.g., bubble up implementation) and/or lowest level (e.g., trickle down implementation) of an event handler hierarchy to ensure that unsupported user interface events are caught. In addition to capturing unsupported events, unsupported events module 120 may record details of the user event. Each unsupported user interface event has context. For example, if a user interface event was a mouse click and an event handler in event handling mechanism 230 did not provide a response to the user interface event, this may be recorded. In addition, the context of the user interface event may be recorded. Examples of context are, the number of mouse clicks (e.g., single click event, double click event, etc.), which object in the view was selected, coordinates of the object selected, and/or a unique identifier related to the independent instance of the application (e.g. application 110b) and/or computing device (e.g., computing device 100). The records with the unsupported event information may be sent to a log for the application developer and/or a data collection server (e.g., data collection server 140 in FIG. 1).

To continue the example above, a user may use a mouse (e.g., user interface component 260) to double click on an image to zoom in to the image. The double click will be received by operating system 250 and passed to application 110. If the zoom function is supported, event handling mechanism 230 may process the user interface event and zoom into the image. If the zoom function is not supported, unsupported events module 120 may record the double click, the coordinates of the image, the name of the image, the view of the webpage containing the image, and/or a unique id associated with the computing device in unsupported events records 270.

Figure 3:
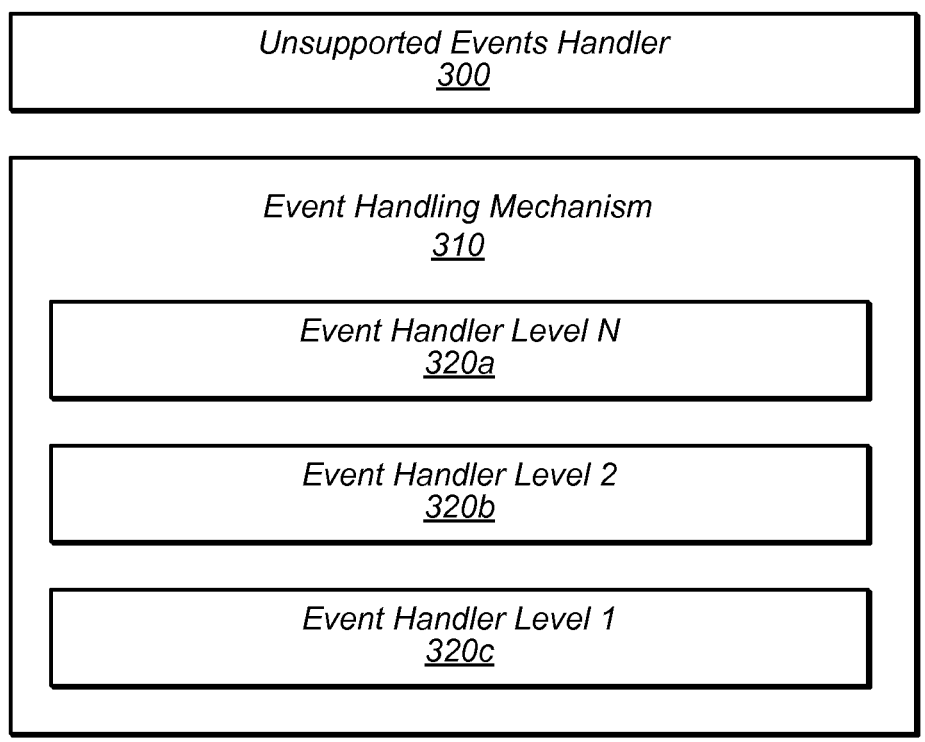
FIG. 3 is a diagram that illustrates the event handling mechanism in accordance with an embodiment of the present technique.

FIG. 3 is a diagram that illustrates the event handling mechanism in accordance with an embodiment of the present technique. As discussed above, event handlers may be implemented at multiple levels to provide a response to a user interface event (e.g. mouse click, key press, screen touch etc) at a user interface (e.g., keyboard, mouse, touch screen). As discussed above in FIG. 2, in some embodiments, the implementation may be "bubble up" or "trickle down". In a "trickle down" implementation, user interface events may propagate through event handler levels from the top down, activating an event handler at the highest level of the hierarchy having a handler for the event. In a "bubble up" implementation, user interface events may propagate through event handler levels from the bottom up, activating an event handler at the lowest level of the hierarchy of the hierarchy having a handler for the event. In either case, the unsupported events module (e.g. unsupported events module 120 in FIG. 2) may be implemented such that it is the last event handler accessed in the hierarchy. This ensures that all unsupported user interface events are captured after they have propagated through the entire event handling hierarchy.

Event handler mechanism 310 may be implemented in any application, device, or platform to process user interface events from a user of a computing device (e.g. computing device 100 in FIG. 1). Event handler mechanism 310 may have one or more event handler levels 320 to respond to user interface events. For example, in a HTML based web page, the web page may be organized into an object, div, body, window format where the object is the lowest level and the window is the highest level for the event handler. In an embodiment of the HTML based web page with a "bubble up" event handler implemented, as described above, an object-level event handler would be the lowest event level handler 320 and a window-level event handler would be the highest event level handler 320. If the object did not have an event level handler 320, then the div event handler would receive the user interface event and it would be processed at the div event level handler 320 if one were implemented for the event, and so on. In a "bubble up" embodiment, the user interface event may continue propagating until the top level (e.g., window level in this example) is reached. At this point unsupported events handler 300 would capture the unsupported user interface event that had "bubbled up" and record the user interface event and/or the corresponding context information as described above.

In alternate embodiments, a trickle down event handling mechanism 310 may be implemented. In this embodiment, the highest event level hander 320 (e.g., window in HTML) may be checked first when the user interface event is received. In this example for the "trickle down" embodiment, if the top level event level handler 320 were not implemented for the event, the next level (e.g., body in HTML) may be checked to handle the user interface event. If at this level, an event level handler 320 is not implemented for the event, the next level event level handler 320 would be checked, etc. Once the lowest level has been reached and no event level handler 320 has handled the event, unsupported event handler 300 records the user interface event and/or the context of the user interface event.

In addition, the "bubble up" and "trickle down" approach implemented may include different methods for propagating the user interface events and/or indicating that the user interface events have been handled. Depending on the software, this may be necessary to ensure that user interface events that reach unsupported events handler 300 have not been handled by event handler mechanism 310. In some applications, for example, the propagation method may be to stop propagating the event once the user interface event is handled. In such an embodiment, locating one or more unsupported event handlers at the end of the application's event handling hierarchy is sufficient to indicate that the event was not otherwise handled. In other embodiments where events may be further propagated after being handled in the application, an attribute may be associated with the user interface event to indicate that the user interface event has been handled. In such an embodiment, an unsupported event handler may check this attribute to determine whether or not the application handled the event. In another embodiment, the developer may have to design the application's event handlers to cancel user interface events once they have been handled to ensure that they do not propagate to an unsupported event handler 300. In another embodiment, the developer may implement a method call that all event handler routines must call. The method may record that the user interface event was handled and/or any context related to the user interface event. The unsupported event handler can check this information to determine whether the event was handled and/or the context.

In another embodiment, in response to receiving a user interface event, the unsupported event handler may check for event handlers at the appropriate levels in the application. For example, a web page may have 'Button A' in 'Div 1' which in turn is in 'Div 2' which is in the body of an HTML document. The unsupported event handler may reside at the body level. In response to a click event for 'Button A' received at the body level, the unsupported event handler may check whether 'Button A' has an onclick event listener attached. If not, the unsupported event handler assumes that the event was not handled at that level. The unsupported event handler may run the same check on the button's parent (in this case Div 1) and its parent recursively until getting back to the body. If neither the originating object, nor any of its ancestors have an onclick event handler, then the unsupported event handler assumes that the click has not been handled and records as much. As discussed above, each of these embodiments may be found in a "bubble up" and or "trickle down" implementation. The unsupported event handler may be the "last resort" event handler to ensure that if a user interface event is not handled at any application event handler level, it is recorded.

Figure 4:
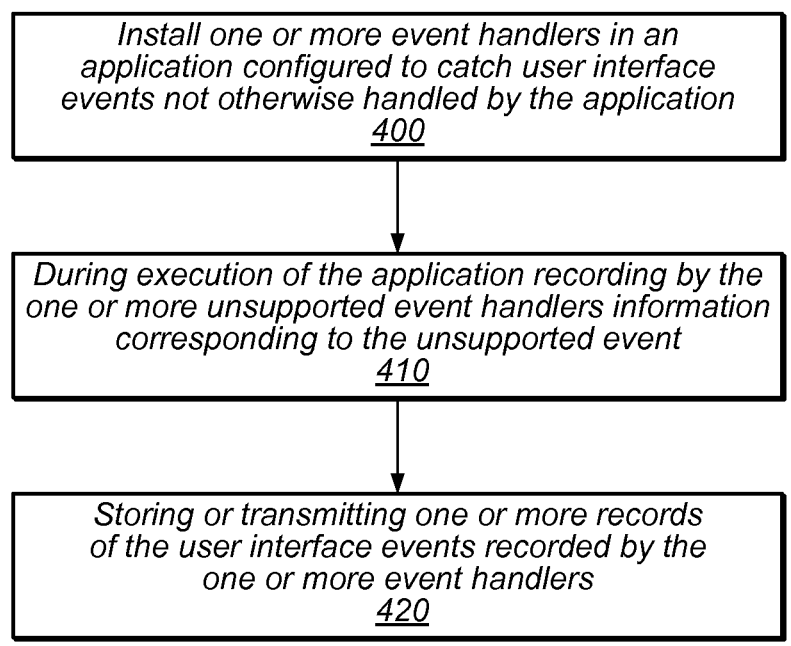
FIG. 4 is a flowchart that illustrates an exemplary method for measuring unsupported user interface events in accordance with an embodiment of the present technique.

FIG. 4 is a flowchart that illustrates an exemplary method for monitoring unsupported user interface events in accordance with an embodiment of the present technique. In general, as discussed above, event handlers (e.g., in event handling mechanism 230 in FIG. 2) may be implemented to respond to user interface events received from user interface components (e.g., user interface components 260 in FIG. 2). User interface events not otherwise supported by the events handlers of the application (or device, or platform) may be monitored and reported (e.g. unsupported events module 120 in FIG. 2). The unsupported user interface events may be recorded during execution of the application (e.g., application 110 in FIG. 2).

As indicated in 400, one or more event handlers configured to catch user interface events not otherwise handled by the application may be installed in an application. In most applications (e.g., application 110 in FIG. 2) there are multiple objects, views, pages or levels where user interaction is possible. One or more event handlers configured to capture user interface events not otherwise handled by the application may be installed at each level in the application to ensure the unsupported user interface events are recorded. For example, in a "bubble up" event hierarchy as described above, the user interface events may be monitored starting at the lowest level of the events in the hierarchy. If a user interface event is not handled at the lowest level, for example, it may "bubble up" to the next level. The user interface event may be captured at the next level. If the event is not captured by an event handler after "bubbling up" through all levels of the application's event handler hierarchy, the user interface event may be recorded as indicated in 410.

As indicated in 410, during execution of the application, recording and/or capturing by the one or more of the installed unsupported event handlers information corresponding to the unsupported user interface event may occur. The information corresponding to the unsupported user interface event may include the user event (e.g., mouse click), the context of the event (e.g. coordinates of the click in the window) and a unique id (e.g. a registration number for the application and/or computing device, user id, session id, etc.) associated with the application and/or computing device recording and/or transmitting the information.

As indicated in 420, one or more records of the unsupported user interface events may be recorded by the one or more event handlers located at the top and/or bottom of an event handler hierarchy (e.g. as described in FIG. 3). The records of the unsupported user interface events may be stored and/or transmitted. The recorded information will be described in further detail in FIGS. 6A-C. The recorded information may be sent to a data collection server for further analysis.

Figure 5:
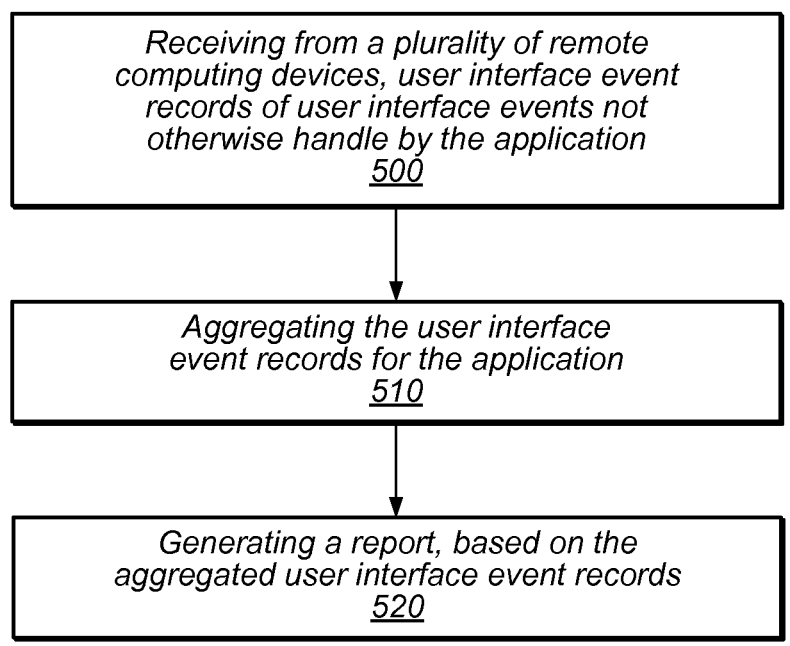
FIG. 5 is a flowchart that illustrates an exemplary method for measuring unsupported events, in accordance with one or more embodiments of the present technique.

FIG. 5 is a flowchart that illustrates an exemplary method for measuring unsupported user interface events, in accordance with one or more embodiments of the present technique. As discussed above, instances of an application (e.g. application 110 in FIG. 1) may monitor unsupported user interface events (e.g. in unsupported events module 120 in FIG. 1). Instances of the application (e.g., application 110 in FIG. 1) may report the unsupported user interface event, the context of the unsupported user interface event and/or a unique id corresponding to the instance of the application.

As depicted in 500, records of a user interface event not otherwise handled by the application may be received from a plurality of remote computing devices, e.g., by a data collection server. The records may include, but is not limited to, the user event (e.g., mouse clicks, screen touches, key presses), an id associated with the user of the application, the instance of the application and/or the computing device implementing the application, and the context of the user event (e.g., object clicked, one or more keystrokes, reverse pinches on a screen). For example, a user may click on a corporate logo and an event (e.g., new web page) is not activated (e.g., unsupported). The mouse click, corporate logo object, coordinates of the object, page view the object is in and/or the unique id associated with the instance may be recorded and/or received.

As depicted in 510, the records received may be aggregated according to the user interface event records for the application. As discussed above, there may be one or more instances of an application (e.g., application 110 in FIG. 1). The data received may be from each instance of the application. The records received from each instance of the application may need to be further aggregated to offer a report of attempts for unsupported user interface events.

As depicted in 520, a report based on the aggregated user interface event records may be generated. The report may include, but is not limited to, tables showing the user interface events tracked, the number of attempts for each event, the number of visitors and/or unique instances of the application. The report may also calculate a metric based on the attempts per visitor. In other embodiments, other data may be reported and in other formats. FIGS. 6A-C illustrates example tables from a generated report. The process depicted in FIG. 5 may be performed by a data collection server receiving the unsupported user interface event records from various remote devices over one or more networks.

FIGS. 6A-C depict an exemplary set of reports in accordance with an embodiment of the present technique. In general, as discussed in previous figures one or more computing devices (e.g., computing device 100 in FIG. 1) may implement instances of an application (e.g. application 110 in FIG. 1). The unsupported events module (e.g., unsupported events module 120 in FIG. 1) may be provided for the application, as discussed above, to capture unsupported user interface events. As unsupported events are captured, the user event (e.g. click, swipe) and the context (e.g., views) may be recorded and/or transmitted to a data collection server (e.g., data collection server 140 in FIG. 1). The data collection server may aggregate the data into reports or tables that depict the number of times an unsupported user interface event is attempted by a unique user and/or visitor to the application. FIGS. 6A-C show example reports that may be generated in response to data received from instances of an application (e.g., application 110 in FIG. 1) on a computing device (e.g. computing device 100 in FIG. 1).

As depicted in FIG. 6A, the unsupported user interface events were monitored at an application level. Three user interface events 630a (e.g., swipes, undos, Ctrl+T) were monitored at the application level. This table may represent the user experience with an application for a smart phone and/or tablet computing device, for example. For each user event, the number of action attempts 600a (e.g. user events attempted) and visitors 610a (e.g., different users of instances of the application) were monitored. As discussed in previous FIGs., the application may be implemented on one or more computing devices (e.g., computing device 100 in FIG. 1). Thus, the column representing visitors 610a may represent the number of unique visitors and/or computing devices with separate instances of the application. Each instance of the application (e.g. application 110 in FIG. 1) may transmit data to be included in a report for a given time period. For example, a swipe 630a at the application level was attempted fifty-six times during a reporting period that had two hundred and seventy six visitors. The attempt percentage 620a is number of attempts divided by the number of visitors during the reporting period. In this example, 20% of unique visitors attempt a swipe 630a at the application level during the reporting period. In response to this data, a developer may decide to implement an event handler for the swipe that users were attempting. Alternatively, the Ctrl+T keystroke at the application level had only one attempt for two-hundred and seventy six visitors. Since Ctrl+T is not attempted very often as compared to a swipe, a developer may decide that future revisions will not implement an event handler for Ctrl+T.

As depicted in FIG. 6B, unsupported user interface events were monitored for two views (e.g., page, application window/panel/screen, etc.). In each view, three user events were tracked (e.g. swipes, rotations, pinches). This table may represent the user experience with an application for a smart phone and/or tablet computing device (e.g. application 110 and computing device 100 in FIG. 1), for example. As described in FIG. 6A, there may be multiple instances of an application on multiple computing devices. As discussed above, the column representing action attempts 600b represents the number of unique visitors (e.g., users) attempting the swipe, rotation and/or pinch, for example. In addition, the column representing visitors 610b illustrates the number of visitors that visited or used the application during the reporting period. As discussed above, the attempts percentage is the action attempts 600b divided by visitors 610b. For example, in View A 630b, the attempts percentage for rotations was 20% but in View B 630b, the attempts percentage rose to 42%. This may indicate that the second view has smaller text, for example, so the user tries to rotate the computing device (e.g., computing device 100 in FIG. 1) in order to a landscape view to increase text size. As discussed above, the developer may decide to implement improvements to the application in order to address the high percentages for rotations for multiple views.

As depicted in FIG. 6C, unsupported user interface events were monitored at the object level. In each view, three user interface events 630c were tracked (e.g. corporate logo click, legend test click, table column header double tap) in multiple views. The table may represent the user experience with a web page on a laptop, table and/or smart phone, for example. As described in FIGS. 6A and B, there may be multiple instances of an application (e.g., application 110 in FIGS. 1 and 2) on multiple computing devices (e.g., computing devices 100 in FIG. 1). As discussed above, column representing action attempts 600c represents the number of unique visitors (e.g., users) attempting the clicks (e.g., mouse clicks) for example. In addition, the column representing visitors 610c illustrates the number of visitors that visited or used the application during the reporting period. As discussed above, the attempts percentage is the action attempts 600c divided by visitors 610c. In this example, 14% of the unique visitors attempted to retrieve another web pages providing information about the corporation and/or return to the main corporate page by clicking the corporate logo. If the developer believes the percentage is high enough, the developer may implement the corporate logo as a link and implement an event handler along with it. Alternatively, the table column header was doubled clicked by only 1% of the individual users so the developer may not dedicate resources to implemented an event handler for the table column header. While the above examples show unsupported events reported in terms of a per-visitor metric, in other embodiments unsupported events may be reported in conjunction with other metrics, such as Page Views, Visits, or Time Spent on View.

Exemplary Computer System

Figure 7:
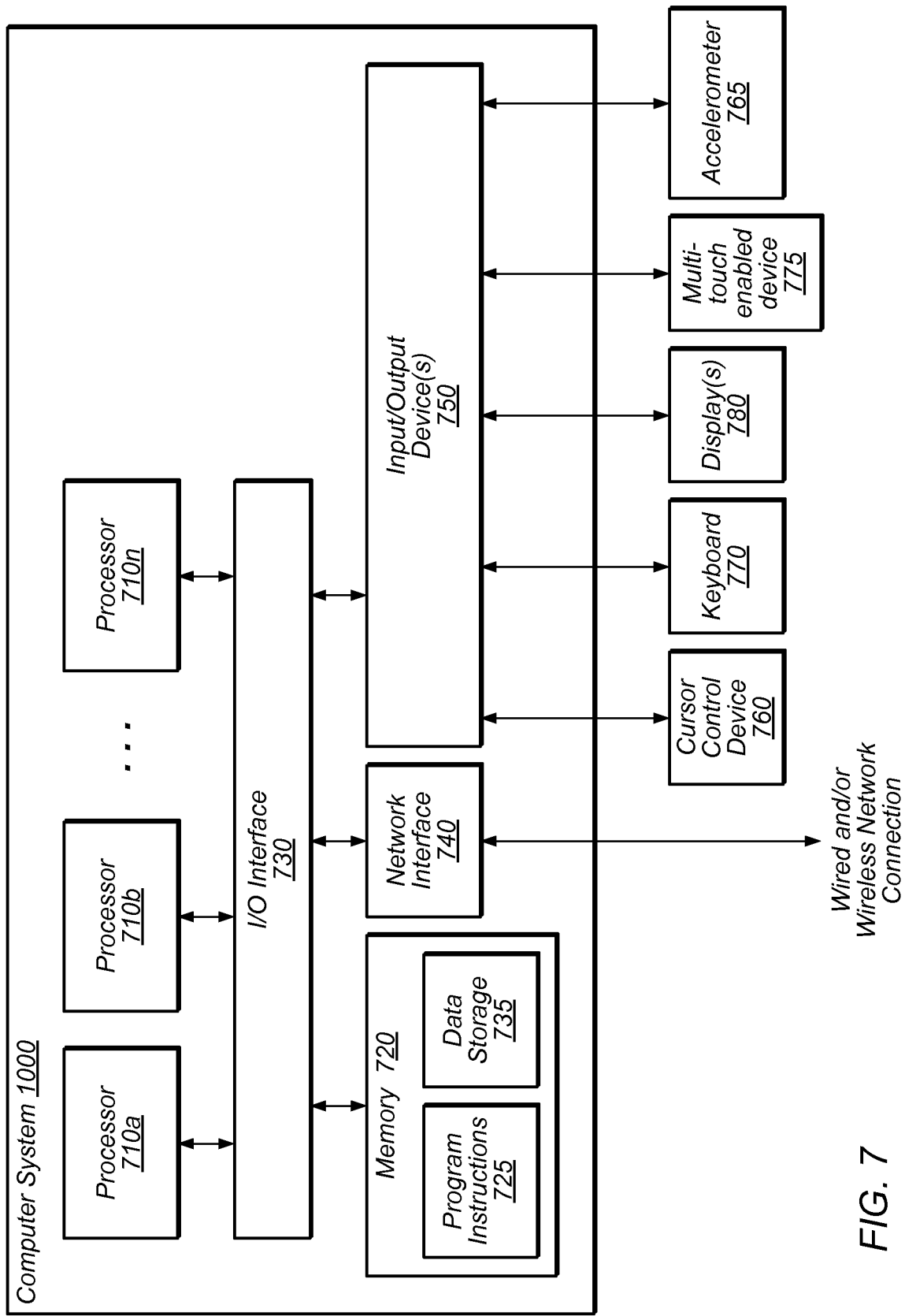
FIG. 7 is a diagram that illustrates an exemplary computer system in accordance with one or more embodiments of the present technique.

FIG. 7 is a diagram that illustrates an exemplary computer system 700 in accordance with one or more embodiments of the present technique. Various portions of systems 100 in FIGS. 1 and 2 and/or methods presented in FIGS. 3-5 and/or described herein, may be executed on one or more computer systems similar to that described herein, which may interact with various other devices of the system. For example, unsupported events module 120 may be executed on a processor in computing device 100 Data collection server 160 may include a computer similar to that of computer system 700.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740. Program instructions may include instructions for implementing the techniques described with respect to method 300.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., data collection server 160), such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, accelerometers, multi-touch screens, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions 725, configured to implement embodiments of a layout-preserved text generation method as described herein, and data storage 735, comprising various data accessible by program instructions 725. In one embodiment, program instructions 725 may include software elements of a method illustrated in the above Figures. Data storage 735 may include data that may be used in embodiments described herein. In other embodiments, other or different software elements and/or data may be included.

Those skilled in the art will appreciate that computer system 700 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A method, comprising:
receiving, by an application hosted on a computing device, a user interface event at a user interface of the application, wherein the application uses an event handling hierarchy of an unsupported event module and event handlers, wherein the unsupported event module is installed in the application as a plug-in;
determining, by the unsupported event module, whether any of the event handlers is capable of supporting the user interface event;
in response to determining that the event handlers are incapable of handling the user interface event, identifying, by the unsupported event module, that the user interface event is an unsupported event, wherein operations of the user interface of the application are unaffected by the unsupported event;
generating, by the unsupported event module, one or more records comprising information about the user interface event and an indication that the user interface event is unsupported; and
storing, by the unsupported event module, the one or more records at the computing device;
transmitting the one or more records from the computing device to a collection server; and
modifying the application on the computing device based on an analysis of the one or more records and of a plurality of records collected at the collection server and associated with instances of the application on a plurality of computing devices, the modifying comprising an update to the event handling hierarchy to include an event handler configured to handle the user interface event and support an additional operation of the application corresponding to the user interface event.

2. The method of claim 1, wherein the application does not respond to user interface events identified as unsupported.

3. The method of claim 1, wherein said recording comprises:
recording an event type for the user interface event; and
recording an event context for the user interface event.

4. The method of claim 3, wherein the event context comprises one or more screen coordinates of the user interface event, window coordinates of the user interface event, page coordinates of the user interface event, user interface view for the user interface event, or user interface element for the user interface event.

5. The method of claim 1, further comprising recording, during execution of the application, usage metrics data for the application, wherein the usage metrics data comprise one or more of visitor or user identifier, page views, visits, or time spent on view.

6. The method of claim 1, wherein the user interface event comprises one or more of: touch screen event, mouse click event, keyboard event, device movement event, or voice command event.

7. The method of claim 1, wherein the application comprises an event handling system in which events are propagated through the event handling hierarchy such that user interface events not supported at one event level of the hierarchy are passed to a next level, and wherein identifying the user interface event as unsupported is determined by identifying that the next level and a parent level of the next level are not configured to support the user interface event.

8. The method of claim 1, further comprising:
determining one or more user interaction levels that are not configured to support the user interface event; and
wherein the recording comprises:
recording the one or more user interaction levels.

9. The method of claim 1, wherein the unsupported event module is at an end of the event handling hierarchy.

10. The method of claim 1, wherein the collection server is configured to generate a report based on the one or more records and the plurality of records, wherein the report is configured to provide metrics about the user interface event at different user-selectable granularity levels.

11. The method of claim 1, wherein the user interface event is received at a location on the user interface corresponding to a user interface object, wherein the determining that the event handlers are incapable of supporting the user interface event comprises determining, by the unsupported event module, that no event handler is attached to the user interface object for the user interface event.

12. The method of claim 1, wherein each of the event handlers and the unsupported event module is at a different level of the event handling hierarchy, wherein the plug-in installs the unsupported event module in the event handling hierarchy, and wherein the operations of the user interface are unaffected by the unsupported event by at least propagating the user interface event through the event handling hierarchy and not changing the user interface based on the user interface event being identified as an unsupported event by the unsupported event module.

13. A method, comprising:
receiving, from a plurality of remote computing devices, user interface event records of user interface events recorded during use of respective instances of an application on the plurality of remote computing devices, wherein:
the recorded user interface events are user interface events that the application flags as unsupported by using an event handling hierarchy,
the event handling hierarchy comprises event handlers and an unsupported event module,
the event handlers are configured to handle events based on corresponding event levels,
the unsupported event module is installed as a plug-in to the application and is configured to identify the user interface events as unsupported based on determinations by the unsupported event module whether any of the event handlers is capable of handling the user interface events, and
operations of a user interface of the application are unaffected by the user interface events being unsupported by the application;
aggregating the user interface event records for the application; and
generating a report, based on the aggregated user interface event records for the application, the report usable to modify the application such that an instance of the application on at least one of the plurality of computing devices is updated to include, in the event handling hierarchy, an event handler configured to handle at least one of the user interface events and support an additional operation of the application corresponding to the user interface event.

14. The method of claim 13, further comprising receiving usage metric data, from the plurality of remote computing devices, for the respective instances of the application on the plurality of remote computing devices.

15. The method of claim 14, wherein the usage metrics data comprises visitor identifiers or user identifiers for each remote computing device or instance of the application.

16. The method of claim 15, wherein said generating a report comprises determining a number of unsupported user interface action attempts per user or visitor.

17. The method of claim 16, wherein said determining a number of unsupported user interface action attempts per user or visitor is performed for each of a plurality of user interface events, wherein said generating a report comprises generating a ranked list or table of the unsupported user interface action attempts not supported by the application ranked according to a percentage of unsupported user interface action attempts per user or visitor.

18. The method of claim 13, wherein the application is not configured support comprise one or more of: touch screen event, mouse click event, keyboard event, device movement event, or voice command event.

19. The method of claim 13, wherein a user interface event record of the user interface event comprises user interaction levels that are not configured to support the user interface event.

20. A system, comprising:
a processor; and
a memory storing an unsupported events module executable by the processor to:
identify a user interface event received by an application as unsupported by using an event handling hierarchy, wherein:
the event handling hierarchy comprises event handlers and an unsupported event module,
the event handlers are configured to handle events based on corresponding event levels,
the unsupported event module is installed as a plug-in to the application and is configured to identify the user interface event as unsupported based on a determination by the unsupported event module whether any of the event handlers is capable of handling the user interface, and
operations of a user interface of the application are unaffected by the user interface events being unsupported by the application;
record, by the unsupported event module, one or more records with information of user interface events that indicate the user interface event and that the user interface event is unsupported;
store or transmit, to a server, the one or more records; and
modify the application on the system based on an analysis of the one or more records, the modification comprising an update to the event handling hierarchy to include an event handler configured to handle the user interface event and support an additional operation of the application corresponding to the user interface event.

21. The system of claim 20, wherein the user interface event comprises one or more of: touch screen event, mouse click event, keyboard event, device movement event, or voice command event.

22. The system of claim 20, wherein the application does not respond to the user interface event recorded by the unsupported event module.

23. The system of claim 20, wherein said record comprises:
record an event type for the user interface event; and
record an event context for the user interface event.

24. The system of claim 23, wherein the event context comprises one or more of a screen coordinates of the user interface event, window coordinates of the user interface event, page coordinates of the user interface event, user interface view for the user interface event, or user interface element for the user interface event.

25. The system of claim 20, wherein the application comprises an event handling system in which events are propagated through the event handling hierarchy such that user interface events not supported at one event level of the hierarchy are passed to a next level, and wherein identifying the user interface event as unsupported is determined by identifying that the next level and a parent level of the next level are not configured to support the user interface event.

26. A non-transitory computer readable storage medium storing computer-executable program instructions that when executed by a computer are configured to cause:
  installing one or more unsupported event handlers as a plug-in to an application, wherein:
    the one or more unsupported event handlers are configured to only receive user interface events not handled by supported event handlers of the application and to determine whether any of the supported event handlers is capable of handling the user interface events,
    the one or more unsupported event handlers and the supported event handlers are arranged in an event handling hierarchy,
    operations of a user interface of the application are unaffected by the user interface events not being handled by the supported event handlers;
  during execution of the application, recording, by the one or more unsupported event handlers, user interface events not handled by the application;
  storing or transmitting one or more records of the user interface events recorded by the one or more unsupported event handlers; and
  modifying the application on the computer based on an analysis of the one or more records, the modifying comprising an update to the event handling hierarchy to include a supported event handler configured to handle at least one of the user interface events and support an additional operations of the application corresponding to the user interface events.

27. The medium of claim 26, wherein said installing the one or more event unsupported handlers comprises installing the plug-in to the application.

28. The medium of claim 26, wherein said recording comprises:
  recording an event type for each of the user interface events not handled by the application; and
  recording an event context for each of the user interface events not handled by the application.

29. The medium of claim 28, wherein the event context comprises one or more of a screen coordinates of the user interface event, window coordinates of the user interface event, page coordinates of the user interface event, user interface view for the user interface event, or user interface element for the user interface event.

30. The medium of claim 26, further comprising recording, during execution of the application, usage metrics data for the application, wherein the usage metrics data comprise one or more of visitor or user identifier, page views, visits, or time spent on view.

31. The medium of claim 26, wherein the user interface events not handled by the application comprise one or more of: touch screen event, mouse click event, keyboard event, device movement event, or voice command event.

32. The medium of claim 26, wherein said storing or transmitting one or more records comprises transmitting the one or more records to a collection server.

33. The medium of claim 26, wherein the application comprises an event handling system in which events are propagated through the event handling hierarchy such that user interface events not handled at one level of the hierarchy are passed to a next level, wherein said installing the one or more unsupported event handlers comprises installing the one or more unsupported event handlers at an end of the hierarchy so that user interface events not handled by the application are recorded by the one or more unsupported event handlers.

* * * * *